United States Patent [19]

Spinner et al.

[11] 4,107,631
[45] Aug. 15, 1978

[54] PROTECTION OF HIGH-POWER COAXIAL CABLES

[75] Inventors: Georg Spinner; Leo Treczka, both of Munich, Fed. Rep. of Germany

[73] Assignee: Spinner GmbH Elektrotechnische Fabrik, Munich, Fed. Rep. of Germany

[21] Appl. No.: 593,270

[22] Filed: Jul. 7, 1975

[30] Foreign Application Priority Data

Jul. 11, 1974 [DE] Fed. Rep. of Germany ....... 2433404

[51] Int. Cl.² .............................................. H03H 7/00
[52] U.S. Cl. ..................................... 333/17 R; 333/10
[58] Field of Search ................. 317/27 R, 44; 333/10, 333/17, 97 R; 324/52

[56] References Cited

U.S. PATENT DOCUMENTS

| | | | |
|---|---|---|---|
| 2,817,813 | 12/1957 | Rowen et al. | 333/10 X |
| 3,238,475 | 3/1966 | De Vita et al. | 333/17 R |
| 3,548,260 | 12/1970 | Krause | 333/17 R X |

Primary Examiner—Paul L. Gensler
Attorney, Agent, or Firm—Ostrolenk, Faber, Gerb & Soffen

[57] ABSTRACT

Method and circuit arrangement for protecting coaxial cable in transmission equipment: at the input and at the output of the cable, a proportional fraction of the high frequency energy is coupled out; the coupled out high frequency energies are compared and there is disconnection when the comparison shows a particular value.

2 Claims, 1 Drawing Figure

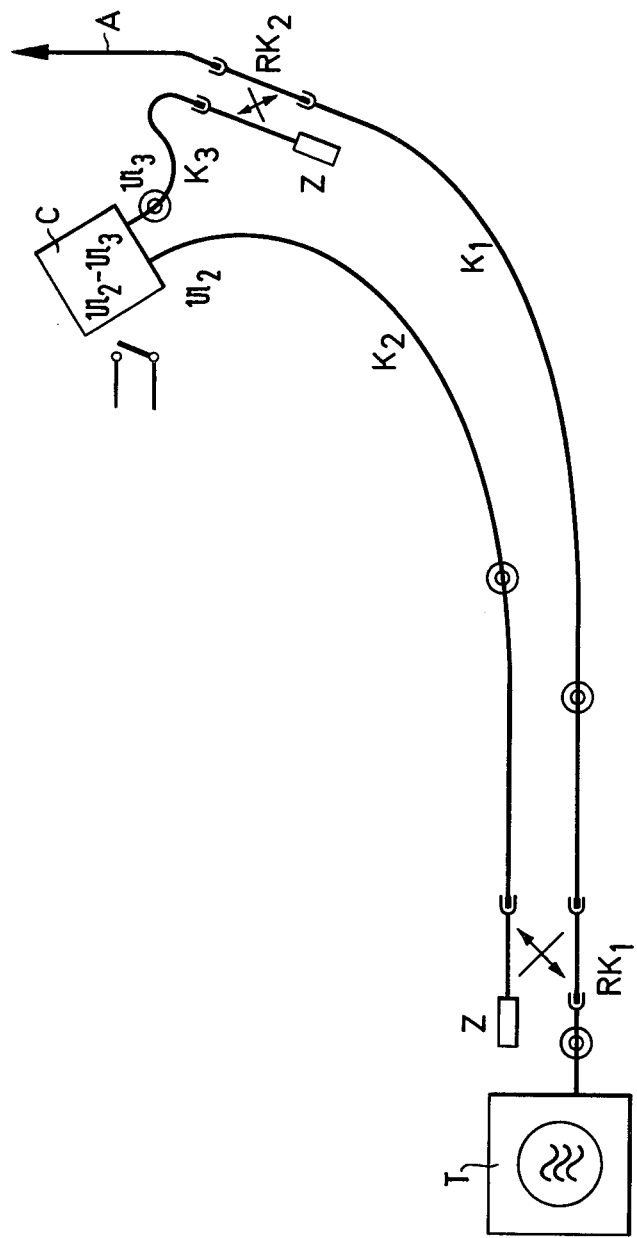

PROTECTION OF HIGH-POWER COAXIAL CABLES

The invention relates to a method and a circuit arrangement for the protection of high-power coaxial cables in transmission equipment from flashover and arcing in the cable.

It is known to protect antenna and cable equipment in transmitters by connecting between the transmitter and cable a directional coupler which effects a disconnection of the transmitter on an excessive increase of the reflection factor. However, this type of protection is unreliable because for example on occurrence of an arc in the cable equipment said arc either arises at the point at which the reflection caused by it seen from the transmitter side is a minimum as said arc moves towards this point with very high velocity. Consequently, a reflectometer at the cable input in very many cases cannot recognize the presence of an arc and cannot prevent the destruction of the cable.

The invention is based on the problem of protecting such high-power coaxial cables more reliably than hitherto and providing a circuit arrangement which on occurrence of all types of faults supplies a warning signal and/or effects immediate disconnection before the cable is destroyed.

According to the invention the method of protecting such high-power coaxial cables is carried out in that at the input and at the output of the cable a proportional fraction of the high-frequency energy is coupled out and that the coupled-out high-frequency energies are compared with each other and that a disconnection is effected when a predetermined difference or sum or quotient value is exceeded, only the forward wave being coupled out. For this purpose, directional couplers are conveniently disposed at the cable input and at the cable output for the coupling out. Instead of the single directional coupler hitherto used, which indicates the reflection, according to the invention two directional couplers are provided, i.e. at the cable input and at the cable output, and by comparison of the coupled-out forward energy at the beginning and at the end of the cable it can be immediately recognized whether energy has inadmissibly been consumed in the cable. If this is the case an immediate disconnection may take place. The high-frequency signals coupled out at the beginning and end of the cable may either be rectified or fed directly to a comparator.

The forward energy coupled out at the cable beginning is preferably conducted via a coaxial cable dimensioned only for the energy of the signal parallel to the energy cable to be protected to the coupling point at the cable end and compared there in the comparator with the signal coupled out at the cable output.

The energy cable and the signal coaxial cable parallel thereto have of course different delay times and consequently to compensate for the resulting phase difference between the coupler provided at the cable end and the comparator a cable must be inserted which compensates the greater delay of the monitoring cable coming from the generator.

The high-frequency evaluation is necessary to eliminate the amplitude modulation or the frequency modulation, thus obtaining an adequately short time constant. In particular, actuation is brought about by the change of the phase position itself and thus the protection actuated in the initial phase of a flashover, provided the disconnection of the transmitter can take place in a correspondingly short time.

The attached drawing illustrates schematically the circuit arrangement according to the invention. A coaxial cable $K_1$ is led between a transmitter T and an antenna A. Near the transmitter a directional coupler $RK_1$ is connected into the coaxial cable $K_1$ and at the cable end adjacent the antenna a further directional coupler $RK_2$ lies in the coaxial cable $K_1$. The energy coupled out via the directional coupler $RK_1$ is fed via a coaxial cable $K_2$ to a comparator C whereas the high-frequency signals coupled out via the directional coupler $RK_2$ are fed to the same comparator C via a coaxial cable $K_3$. Both directional couplers are closed with a wave resistance Z.

The attached drawing further labels the voltages which are compared in comparator C as voltage $U_2$ and voltage $U_3$ with the comparator comparing $U_2$ and $U_3$ by subtracting $U_2$ from $U_3$. Other comparisons could be made, as by dividing the measured parameters to determine their quotient. A contact is shown to the left of comparator C, which contact can be connected to any desired supervisory circuit and which can be closed when comparator C measures a value of $U_2 - U_3$ greater than some predetermined value.

The lines $K_1$ and $K_2$ are coaxial lines, as indicated schematically by the double circles. Coaxial cable $K_1$ and coaxial cable $K_2$ parallel thereto have different delay times which, if not compensated for, will result in a phase difference between the signals extracted by directional coupler $RK_1$ and directional coupler $RK_2$. To compensate for the differences in the delay times of cables $K_1$ and $K_2$ and to assure that the signals compared by comparator C are in phase, a cable $K_3$ is inserted between directional coupler $RK_2$ which compensates for the greater delay of cable $K_2$.

Means are also provided (not shown) to disconnect the cable from the transmitter if the output of comparator C indicates an inadmissible, or excessive consumption of energy in the cable $K_1$.

We claim:

1. In a high frequency transmission system comprising a high frequency and high power transmitter, an electrical output circuit, and a first coaxial cable for connecting said transmitter to said output circuit, a detection circuit for detecting flashover and arcing in said first coaxial cable, said detection circuit comprising:

first and second directional couplers, said first directional coupler connected to one end of said first coaxial cable adjacent said transmitter, said second directional coupler being connected to said first coaxial cable at a point along said first coaxial cable which is removed from said end of said first coaxial cable adjacent said transmitter;

comparator circuit means having first and second inputs;

a second coaxial cable connecting the signal output of said first directional coupler to said first input of said comparator circuit means;

a third coaxial cable connecting the signal output of said second directional coupler to said second input of said comparator circuit means;

said first and second coaxial cables having different delay times, the delay time of said third coaxial cable being chosen such that said signal outputs of said first and second directional couplers are in phase when they are applied to said first and second input of said comparator circuit means whereby a predetermined difference between the magnitude of said signals applied to said compara- tor circuit means is indicative of a fault in said first coaxial cable.

2. The system of claim 1 wherein said second coaxial cable is substantially coextensive with said first coaxial cable.

* * * * *